May 13, 1958  W. A. LIEB  2,834,023
ANTERIOR CHAMBER LENSES FOR REFRACTIVE CORRECTION
OF APHAKIA, HIGH AMETROPIA AND ANISOMETROPIA
Filed Feb. 6, 1957  2 Sheets-Sheet 1

INVENTOR
WOLFGANG A. LIEB

BY Cushman, Darby & Cushman
ATTORNEYS

May 13, 1958 W. A. LIEB 2,834,023
ANTERIOR CHAMBER LENSES FOR REFRACTIVE CORRECTION
OF APHAKIA, HIGH AMETROPIA AND ANISOMETROPIA
Filed Feb. 6, 1957 2 Sheets-Sheet 2
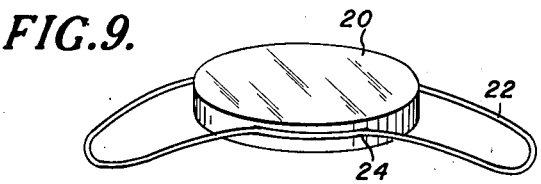
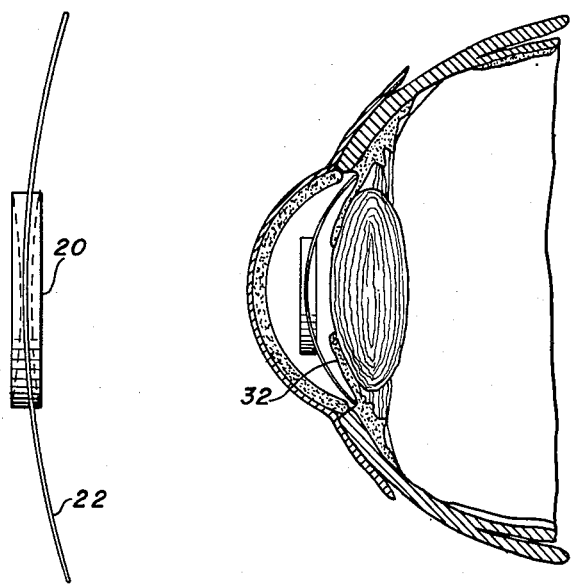
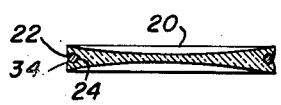
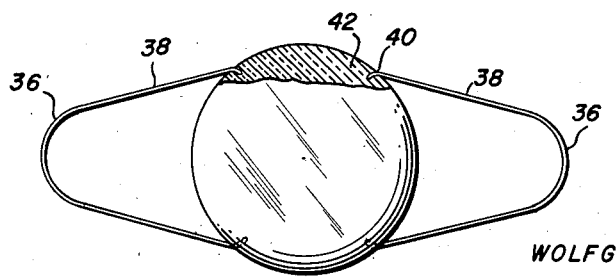
INVENTOR
WOLFGANG A. LIEB
BY Cushman, Darby & Cushman
ATTORNEYS

United States Patent Office 2,834,023
Patented May 13, 1958

2,834,023

ANTERIOR CHAMBER LENSES FOR REFRACTIVE CORRECTION OF APHAKIA, HIGH AMETROPIA, AND ANISOMETROPIA

Wolfgang A. Lieb, Richmond, Va., assignor to Titmus Optical Company, Inc., Petersburg, Va., a corporation of Virginia Application February 6, 1957, Serial No. 638,484

7 Claims. (Cl. 3—1)

This invention relates to improvements in ophthamalogy, and is primarily concerned with anterior chamber lenses for refractive correction of aphakia, high ametropia and anisometropia, and bilateral and unilateral cateracts.

It has heretofore been proposed to utilize other lenses for this purpose and, in particular, to position the same in the posterior chamber, i. e., in the rear of the iris and disposed freely in the adjacent vitreous area. This permitted, in some instances, the lens to move, and the failure to provide means whereby the lens would be retained fixed has frequently caused serious complications. In brief, the use of an artifical lens to replace the original lens of the eye and located in the same position as the natural lens in the posterior chamber, has failed to be successful in frequent instances because the lens could not be kept in place and as susceptible, more or less, to objectionable movement.

I have discovered that these difficulties are overcome by placing a suitable lens in the anterior chamber, i. e., between the cornea and the iris, and utilizing a lens of conventional composition and of suitable power for the particular individual, the natural lens being removed, if desired. The lens hereinafter described is fixed in position in the anterior chamber and retained against the objectionable floating or free movement which heretofore was observed when the lens was located in the posterior chamber by providing a lens having supporting means to secure it against undesirable movement in the anterior chamber while, at the same time, permitting the minor flexings which are required to accommodate for the stresses induced by the normal movements of the eye and pressures thereon, without, in any way, adversely affecting the vision of the user or damaging the eye.

Accordingly, it is an object of this invention to provide a novel combination for anterior chamber lens and mounting means therefor. It is a further object of this invention to provide an anterior chamber lens having attached thereto rod-like mounting means in the form of flexible loops or wings. It is a specific object of this invention to provide an optical lens having resilient mounting means for positioning the lens in the anterior chamber of the eye between the cornea and the iris, the mounting means comprising tapering wing-like loops of a thin rod or wire of resilient material which are secured to the lens and terminating in arcuate end portions having a radius of curvature less than that of the lens itself.

Other objects will become apparent from the following description of the invention.

In the accompanying drawings:

Figure 6 is a view similar to Figure 3 but utilizing a diverging lens;

Figure 7 is an elevation of the lens shown in Figure 6 showing the retaining groove in the lens in cross section;

Figure 8 is a view similar to Figure 5 of the converging lens of Figures 6 and 7;

Figure 9 is a perspective view of the lens shown in Figures 6, 7 and 8 and the mounting means;

Figure 10 is a view similar to Figure 2 but illustrating a form of the invention wherein the normal crystalline lens has not been removed. This is desirable, particularly in cases of high ametropia and anisometropia; and Figure 11 shows an alternative form of mounting means.

Referring to Figures 1 to 5 of the drawings, there is illustrated a converging type of lens, and in Figures 6 to 9 there is illustrated a diverging type of lens. Any suitable type of lens can be used as prescribed by the physician in accordance with this invention.

Preferably, the lens, which is illustrated generally by the numeral 20, is made of a suitable optical material which must have the following properties:

(1) Suitable refractive index, e. g., at least greater than the refractive index of the aqueous humor, preferably at least 1.49.

(2) Lightweight.

(3) Non-toxic and non-irritating to the sensitive fluids and tissues of the eye.

(4) Inert, i. e., has the required chemical stability and is unaffected by the tissues and fluids of the eye, and does not affect the same.

Suitable optical materials having the aforementioned attributes include polyesters, such as diethylene glycol bis-allyl carbonate resin, polyacrylates and polymethacrylates such as methyl methacrylate resin, optical glass, etc. The presently preferred material is methyl methacrylate resin, available, for example, under the trademarks "Lucite" and "Plexiglas." As will be appreciated, the composition of the lens, as well as the configuration of the lens, will be of a power and structure prescribed by the physician.

Figure 1:
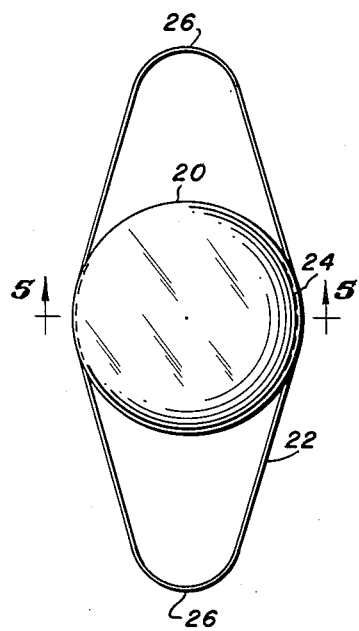
Figure 1 is an elevation of the lens and the tapered wing-like mounting means.
Figure 3:
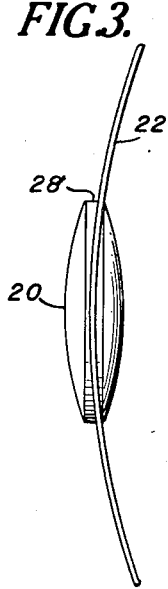
Figure 3 is a side elevation of the lens shown in Figure 1.
Figure 4:
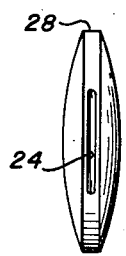
Figure 4 is a side elevation of the lens and partly in section.
Figure 5:
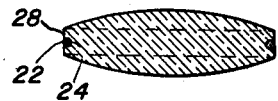
Figure 5 is a sectional view on the line 5—5 of Figure 1 and showing the groove in the lens which receives the retaining means, and which is illustrated in section in Figure 4.

Referring to Figures 3, 4 and 5, the convex lens there illustrated has a cylindrical portion 28 and at diametrically opposed locations in this cylindrical portion there are provided grooves 24. These grooves 24, as shown in Figures 1 and 3, receive the mounting means 22 in the form of a continuous rod or wire of generally oval shape and formed preferably of a suitable plastic, such as the material of which the lens itself is formed, although other suitable materials may be utilized. Important considerations with respect to the mounting 22 are that it have the chemical properties required of the lens material, as indicated above, and that it, furthermore, be sufficiently strong to be self-sustaining and resilient. The material of the mounting 22 need not, however, have the optical requirements of the lens.

Figure 2:
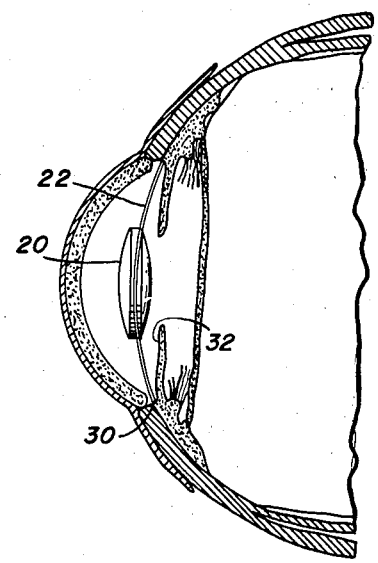
Figure 2 is a sectional view showing the lens of Figure 1 in position in the anterior chamber and with the original lens of the eye removed.

The resiliency of the mounting means is a very important feature of the invention in that, when the lens is mounted in the eye, even slight pressure on the eye or movements thereof will induce stresses in the tissues at 28, shown in Figures 2 and 10. A prime objective is, then, not to impair the aqueous dynamics, and especially not in respect to a rise in intraocular pressure caused by an obstruction of the anterior chamber angle 28. At the same time, the central fixation of the implanted lens has to be maintained in order to accomplish a permanent and satisfactory optical result. A further requirement is that the lens, and particularly the mounting means, occupy as small a space as possible in order that a minimum amount of fluid be displaced. It is also important that the lens be easily inserted in the eye. The generally tapered wing-like structure for the resilient rod or wire, illustrated in the drawings with the reduced rounded end portion 26 and 32, Figures 1 and 11, is particularly well-adapted to meet these objectives.

It will be observed that the loops are also shown as having a generally hyperbolic curve when viewed from the side, see Figure 3. This curve is advantageous since contact with the iris 32, shown in Figures 2 and 10 is avoided, thus reducing the possibility of foreign body irritation.

In accordance with the invention, rod or wire 22 is placed in the peripheral grooves 24 and then the lens and rod are affixed together in any suitable manner, e. g., by fusion with a heat treatment or by means of an adhesive. In some cases, the construction of the groove is such that when the rod is positioned in the same, the lens and rod are securely fixed together without the necessity of heat or glue.

This last embodiment of the invention is illustrated in Figure 8, where the groove 24 has inwardly protruding lips 34 so as to partially restrict the channel opening so that the width thereof is less than the diameter of the rod. The rod or wire mounting means is pressed into the groove and retained by the lips 34.

While I have illustrated the rod or wire mounting means 22 as being continuous, it will be appreciated that, although this is preferred, such mounting means may be discontinuous and in the form of separate loops 38 having the ends thereof 40 anchored to the lens at peripherally spaced points on the portion 42, as shown in Figure 11.

As will be appreciated, various modifications can be made in the invention as described above. Accordingly, it will be understood that the invention is not limited to the foregoing description, except as it is defined in the appended claims.

I claim:
1. An optical lens having resilient mounting means for positioning said lens in the anterior chamber of the eye between the cornea and the iris, said means comprising loops formed of a thin rod of resilient material secured to said lens and in the form of tapered wings terminating in arcuate end portions having a radius of curvature less than the radius of curvature of the lens.

2. The article of claim 1 wherein said loops are curved transversely to the plane of the lens so as to terminate externally of said plane and on the same side thereof.

3. The article of claim 1 wherein said mounting means are fused to said lens.

4. The article of claim 1 wherein said mounting means are affixed to said lens by an adhesive.

5. An anterior chamber lens comprising in combination an optical lens having peripheral grooves and mounting means for positioning said lens in the anterior chamber of the eye, said means comprising a resilient rod positioned in said grooves, said rod forming laterally opposed tapered wings terminating in rounded end portions having a radius of curvature less than the radius of curvature of said optical lens.

6. The article of claim 5 wherein said grooves have lip portions at the opening thereof adapted to restrain said rod in said groove.

7. An anterior chamber lens comprising in combination an optical lens and mounting means attached thereto, said mounting means comprising resilient rods formed into open-end loops, the open ends of said loops secured to the periphery of said lens, said loops extending in laterally opposed directions from said lens and terminating in arcuate end portions having a radius of curvature less than the radius of curvature of said lens.

No references cited.